United States Patent [19]

Edwards

[11] Patent Number: 4,754,297

[45] Date of Patent: Jun. 28, 1988

[54] CAMERA AND FILTER ASSEMBLY

[76] Inventor: Clarence C. Edwards, 4256 E. Capitol St., Washington, D.C. 20019

[21] Appl. No.: 22,743

[22] Filed: Mar. 6, 1987

[51] Int. Cl.$^4$ .......................... G03B 17/00; G02B 5/22
[52] U.S. Cl. .................................. 354/202; 354/289.1; 352/45; 350/315
[58] Field of Search ............ 354/100, 202, 125, 289.1, 354/295; 352/42, 45, 66; 350/315, 318

[56] References Cited

U.S. PATENT DOCUMENTS

| | | | |
|---|---|---|---|
| 1,109,077 | 9/1914 | Lockyer | 354/125 |
| 1,130,221 | 3/1915 | Riper | 352/45 |
| 2,199,057 | 4/1940 | Tuck et al. | 352/66 |
| 3,987,461 | 10/1976 | Kondo | 354/295 |

Primary Examiner—A. A. Mathews
Attorney, Agent, or Firm—Mason, Fenwick & Lawrence

[57] ABSTRACT

A camera is provided with a color filter in the light path immediately in front of the film. Preferably, the camera is of the type having a film strip movable from a supply reel to a take-up reel, and the color filter is in the form of a strip of filters of different colors, carried by a pair of spaced reels mounted in the camera for movement of the filter strip in front of the film strip. An indicator is provided for indicating the color of the filter in position in the light path in the camera.

19 Claims, 2 Drawing Sheets

CAMERA AND FILTER ASSEMBLY

BACKGROUND OF THE INVENTION

The present invention relates to a camera apparatus and more particularly to a camera and a filter in association with it.

Among the widely used types of cameras are those in which a camera body is provided with a pair of reels at the back of the body, for transporting photographic film, a lens at the front of or attached to the camera body and a shutter in the body. A typical example of such a camera, in which interchangeable lenses are attached to the basic camera body, and consequently form a part of the camera, is the well-known single lens reflex camera. Another type of camera in widespread use has a film pack, that is, a plurality of photographic film sheets in stacked array held at the back of the camera, with the lens at the front of the camera: an example of this type of camera is the development-type camera in which the film is of a special type and contains not only light sensitive materials, but developers for the light sensitive materials.

As is well known, color sensitive photographic films are widely used in both of the above types of cameras. Photographers have long been aware that the utilization of light modifying elements, such as light filters of various colors and polarizers, can enhance the photographs produced. Typically, a photographer using a single lens reflex camera may have available one or more color filters in the form of discs which fit over the lens barrel or lens attachment of a single lens reflex camera, in advance of the lens elements, themselves. Such color filters are conventional, and a photographer may carry many different color filters among the accessories which he uses for color photography with such cameras. These color filters are somewhat expensive and are unwieldly, in that one has to be selected and put in place for a particular exposure, and then replaced by an alternate color filter of a different color, where the photographer desires to achieve a different effect in the resulting photograph.

In addition, various patents have disclosed combination camera and filter or light modifying apparatus.

Wieszeck 3,185,053 provides a light control mechanism for a development-type camera which includes a pair of sectors, located in the film path between the aperture and the film, and relatively close to the aperture. These sectors comprise portions of graduated density (color or neutral) and a sector of gradually increasing opacity or density. A temperature sensitive element causes the sectors to be moved so that one or another of the portions are brought into the light path, in order to compensate for temperature effects on the development-type film used in such a camera.

Carlson 3,673,934 discloses a movie camera with a movie film pack and correction for color temperature, there being a color translucent filter placed rearwardly of and adjacent to the camera lens.

Thompson 2,315,284 provides a camera having a disc rotatably mounted just rearwardly of the lens and having a plurality of filters, each selectively positionable in the light path from the lens to the film.

Harvey 3,580,148 provides a camera including blade elements of transparent photochromic material which may be moved selectively into position immediately behind the camera lens position.

Whiddit 156,245 provides, in a plate-type camera, a screen of thread, wire or gauze in front of a frame for holding a photographic plate, the screen being moved in its plane during the exposure of the photographic plate in order to "soften" the photographic impression on the plate.

SUMMARY OF THE INVENTION

A camera is provided having provision for positioning a strip of filters in the light path between the camera lens and the photographic film, and more particularly, for supporting the filter at the back of the camera immediately in front of the film. Preferably, the filter is in the form of a strip of serially arranged filter elements, each of a size to substantially cover one exposure of the photographic film, such as one exposure on a conventional roll of film, although a single exposure on a film pack is also contemplated. The filter strip, or strip of filters, is preferably connected at either end to a pair of spaced reels. The reels are positioned, in one embodiment, so that the strip of filters is moved in a path which is perpendicular to the path of movement of the film, so that when the camera is held in its normal position and the film is moved between the reels horizontally, the filter-strip is moved vertically: in this embodiment, the axes of the filter reels are perpendicular to the axes of the reels for the film strip. In an alternate embodiment, the axes of the film reels are parallel to the axes of the reels for the filter strip; here the movement of the filter strip is, at least in part, parallel to the movement of the film strip.

An indicator is provided on a reel of the filter strip to indicate which color of filter is in position in front of and substantially covering the film to be exposed, so as to enable the user of the camera to position a selected color filter in operative position within the closed camera. While reference has been made to a strip of filters of different colors, the strip may additionally include, or be entirely composed of, other types of light modifying materials, such as light polarizers and may include a clear portion.

Among the objects of the present invention are to provide a camera apparatus in which a plurality of filters may be readily carried and a desired filter selectively and readily positioned in advance of a portion of film in position in the camera to be exposed.

Another object is the provision of a camera apparatus in which economical filter and/or other light modifying materials may be provided of readily available and economical construction, and positioned so as to minimize any defects or distortions in such filter or light modifier.

Still another object is to provide a construction in which the filters are protected from injury.

Other objects and many of the attendant advantages of the present invention will be readily understood form the following specification and claims, and the appended drawings.

DESCRIPTION OF THE PREFERRED EMBODIMENTS

Figure 1:
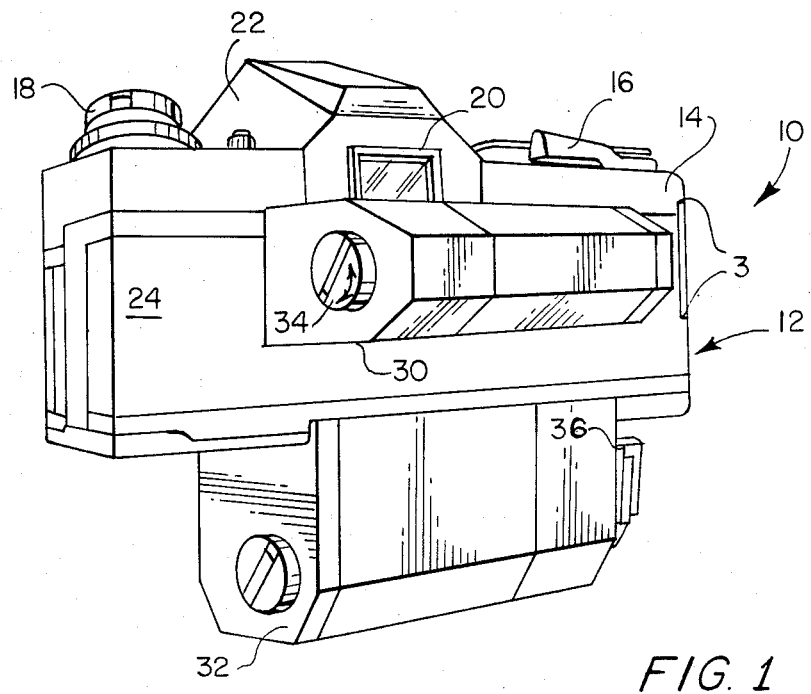
FIG. 1 is a perspective view, taken from the rear, of a camera apparatus in accordance with the present invention.

Referring now to the drawings, wherein like or corresponding reference numerals are used for like or corresponding parts throughout the several views, there is shown in FIG. 1 a camera apparatus 10 which includes a camera generally designated 12. Camera 12, as illustrated, is a single lens reflex camera using 35 mm film. Such cameras are sold under the trademarks "CANON", "MINOLTA", etc. Such cameras are characterized by a body 14 in which are a pair of spaced film carrying reels, one reel being rotated by a film advance lever 16, at the opposite end of the body there being provided a rewind device 18 for the other reel. Viewing is effected through a viewing aperture 20, which views the scene to be photographed through the lens, utilizing a prism positioned within the prism housing 22, a movable mirror (not shown), and a detachable lens barrel. A hinged back plate enables the loading and unloading of film into the camera 12.

The apparatus 10 includes, in addition to standard 35 mm single lens reflex camera 12, a reel housing 30 which is attached to, for example, the camera back plate 24. A second reel housing 32 is provided, and is preferably attached to the bottom of the camera body 14. The reel housing 30 may be provided with a conventional folding crank 34, similar in construction to the conventional film rewind crank 18, and the housing 32 may be provided with an advance lever 36.

Figure 2:
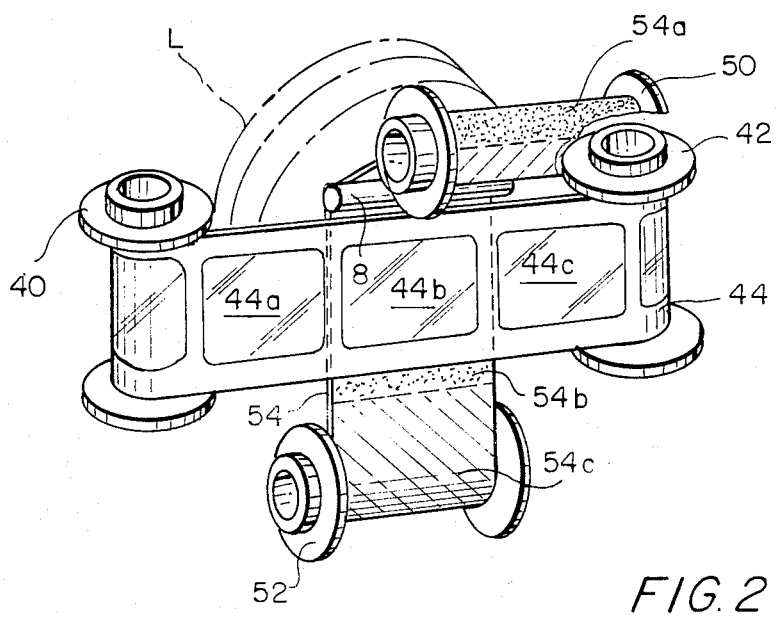
FIG. 2 is a rear perspective view, with parts broken away, of the camera of FIG. 1 and showing a filter strip and film, with their respective reels.

Referring now to FIG. 2, there is shown, somewhat schematically, a film supply reel 40 and a film take-up reel 42, each having an end of the photographic film 44 attached thereto in normal fashion. The reels 40 and 42 have their axes extending vertically, and as will be understood, the film advance lever 16 (see FIG. 1) causes rotation of reel 42 to advance film 44 while the crank 18 will cause rotation of reel 40 to rewind the film 44. Film 44 has segments 44a, 44b and 44c, with segment 44b in position to be exposed, being at the rear of the light path through the camera 12. Also seen in FIG. 2 is a portion of the lens L which admits light into the camera 12 which defines in part the light path leading to the film segment 44b. There is also shown a portion of the shutter S, and film guides 46 for the film 44.

In FIG. 2, there are shown a reel 50 and a reel 52, having their axes horizontal, and therefore perpendicular to the vertical axes of the reels 40 and 42. Reel 50 is contained in housing 30 and reel 52 is contained in housing 32, not shown in FIG. 2. On the reels 50 and 52, there is a strip of light modifying material, comprising a series of segments, each of which is, for example, a filter of a different color. The filter strip 54 will be seen to be made up of a blue filter segment 54a, a yellow filter segment 54b, and a red filter segment 54c. Other color filters and/or polarizers or other light modifiers may comprise the strip 54. A segment of strip 54 may be clear, so that the apparatus 10 can be used to obtain a photograph without light filtering, polarizing or other modification. Each of the segments of the strip 54 will be seen to be located at the back of the camera 12, and each is of approximately the same size as a segment 44a, 44b, 44c, etc. of the photographic film strip 44. The strip 54 is positioned by guides 56, 58 so as to be immediately in front of the photographic film 44, at the rear of the camera, and in the light path just prior to the segment or "exposure" portion of the film 44 which is in the light path of the camera 12. Positioning guides 56, 58 may be bars or rollers, or the edges of slits (not shown) in the camera 12 for passage of strip 54.

Figure 3:
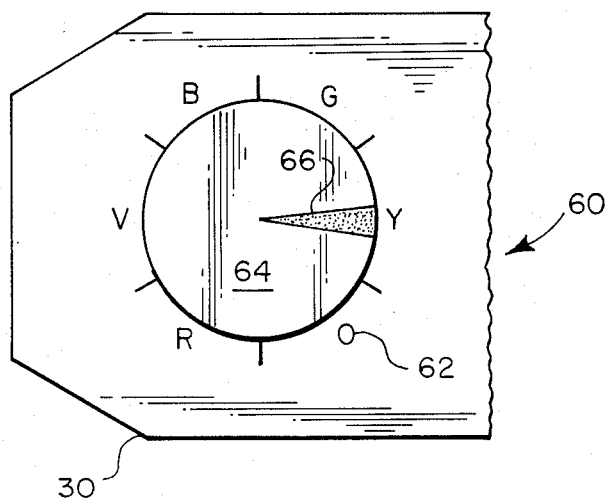
FIG. 3 is a view taken on the line 3—3 of FIG. 1, showing an indicator.

Referring now to FIG. 3, there is shown an indicator generally designated 60 which is on the end of the housing 30. The indicator 60 includes letters representing colors of portions or segments of the filter strip 54, the markings being indicated by the numeral 62, and include the initial letters of such colors as orange, red, violet, blue, green and yellow. An indicating and rotatable disc 64 is provided, with an index mark 66, shown in FIG. 3 positioned to indicate the color yellow. As will be understood, rotation of reel 50 within the housing 30 will cause rotation of the disc 64 to thereby indicate to the user which of the segments or portions of the strip 54 is in position in front of the film 44.

Figure 4:
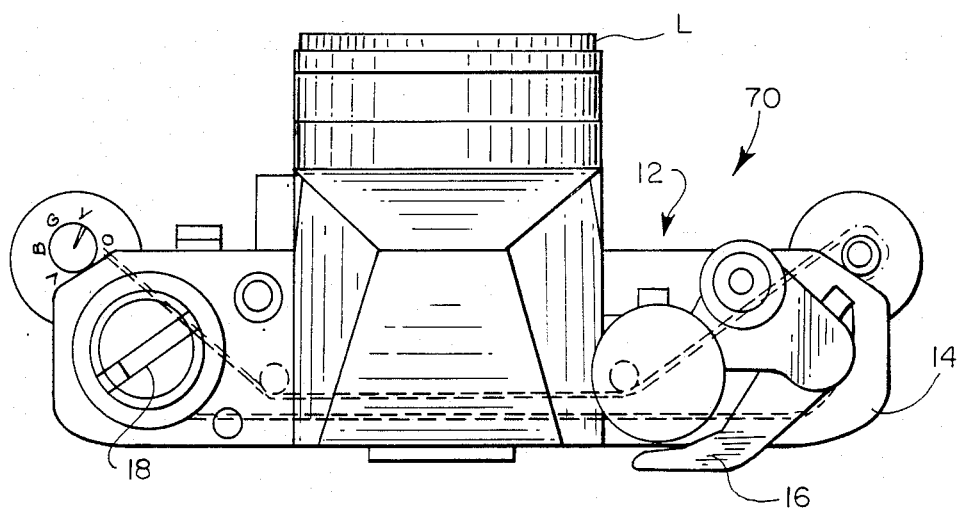
FIG. 4 is a plan view of an alternate embodiment of camera apparatus in accordance with the present invention.

FIG. 4 discloses an alternate embodiment of camera apparatus in accordance with the present invention, there being shown therein a camera apparatus generally designated 70, and including camera 12. There may be seen the attached lens L and the shutter S, schematically indicated. The film 44 may be seen extending within the camera body 14 in normal manner, rearwardly of the shutter S.

A filter strip 54 is shown, extending between reels contained within housings 82 and 84 which are attached to the body 14 and which have reels within them to which the ends of the strip 54 are attached. The axes of the reels for filter strip 54 are vertical, and are parallel to the axes of the reels for the film 44. As a consequence, in the normal position of the camera apparatus 70, substantially the same as that shown in FIG. 1, the film 44 will be moved in a horizontal path, and additionally, the filter strip 54 will also be moved in a horizontal path. Movement of filter strip 54 will be assisted by suitable rollers, such as the rollers 86. In addition, the housing 82 is provided with an indicator 60.

Details of construction have been omitted for clarity. For example, details of the camera 12 are omitted, since they are well known, and are the same or similar in the various models of single lens reflex cameras as illustrated. Attachment of the housings for the filter strip is by suitable means, such as fasteners and/or adhesive. As will be understood, rollers or other guides will be provided as necessary to prevent contact of the filter strip with the film and certain parts of the camera. Light traps are provided to prevent light from entering the camera body through the access slits for the filter strip.

While there has been illustrated a camera apparatus in accordance with the present invention in which the basic camera disclosed is the popular single lens reflex 35 mm camera, it will be understood that other cameras, both reel type, pack or plate type, may be utilized in the practice of the present invention. Further, although the preferred construction for the filter is provided by a strip of serially arranged filters of different color and/or other light modifying material which substantially covers the segment of the photographic film to be exposed, a plurality of filters may be provided for individual insertion into and removal from a camera, whether of the type having films transported between reels or film pack type cameras, or plate-type cameras. The filter may be introduced into and removed from the camera at the back of the camera, and the operative portion is positioned just forwardly of the photographic film.

Because the filter is placed closely adjacent the film, the filter may be comparatively inexpensive.

There has been provided a camera apparatus enabling photographs to be taken with a color filter, or other light modifying apparatus, and in the embodiments of the invention herein disclosed in the drawings, the filter is protected against damages such as scratches and the like. A desired filter or other light modifying material may be brought into the operative position quickly and an indication given of the character of the filter or light modifying segment which is in operative position. Further, due to the present invention, the filter is readily at hand for use when desired, it not being necessary that a large quantity of filters be carried with the photographer or that the photographer seek out the particular color filter desired from a large number of filters which he carries, and then place the selected one on the lens barrel. Thus, the present camera apparatus provides a more facile apparatus for taking color filtered photographs or photographs with other light modifications.

It will be obvious to one skilled in the art that various changes may be made without departure from the spirit of the invention, and therefore the invention is not limited to that shown in the drawings and described in the specification, but only as indicated in the appended claim.

I claim:

1. In combination,
   (a) a camera comprising means defining a path for light therein, said camera having at the front thereof means for admitting light thereinto, a shutter, said camera having means for holding and advancing light sensitive photographic film transversely of the light path at the back thereof, and
   (b) means for positioning one selected segment of a light color modifying means having a plurality of light color modifying segments in said light path at the back of the camera immediately in front of a portion of photographic film supported by said film holding means in position to be exposed upon actuation of said shutter, said positioning means positioning only said light color modifying means.

2. The combination of claim 1, said light modifying means comprising a color filter.

3. The combination of claim 1, said light modifying means comprising a strip of filters of different colors in serial array, each of approximately the same size as the photographic film capable of being exposed upon operation of said shutter, and filter supporting means enabling a selected filter to be brought into the light path.

4. The combination of claim 3, wherein said filter supporting means comprises a pair of spaced filter reels, and means for mounting said filter reels on said camera.

5. The combination of claim 4, said holding means comprising a pair of spaced film reels parallel to said filter reels.

6. The combination of claim 4, said holding means comprising a pair of spaced film reels perpendicular to said filter reels.

7. The combination of claim 1, said light color modifying means comprising a strip of different light color modifying means in serial array, and filter supporting means for moving said strip to place at least one of said different light color modifying means in position in front of film held by said film holding means.

8. The combination of claim 7, and means for indicating which of said different light color modifying means in said position.

9. The combination of claim 1, including means to prevent contact of said light color modifying means and said photographic film.

10. A camera and in combination therewith a support for a light modifier,
    said camera comprising a body having a lens at the front thereof, a shutter, and means for holding photographic film at the back thereof,
    said support comprising means for selectively positioning one selected segment of a light color modifier having a plurality of light color modifying segments at the back of said camera in front of and adjacent to film held by said holding means, said positioning means positioning only said light color modifier.

11. The combination of claim 10, and a light modifier comprising a strip of different light modifying elements, each of approximately the same size as a film exposable upon operation of said shutter, whereby said strip may be moved transversely of the light path between said shutter and film in said camera which is in position to be exposed upon operation of said shutter.

12. The combination of claim 11, and further comprising means for indicating the modifying element of said light modifier which is in said light path.

13. The combination of claim 9, including means to prevent contact of said light color modifier and said photographic film.

14. A camera apparatus comprising:
    (a) a camera body having a lens at the front thereof, a shutter, and film holding means at the back thereof comprising a pair of spaced, parallel first reels for bringing successive portions of film into position to be exposed upon operation of said shutter,
    (b) filter means comprising a strip of filters of different colors and each of approximately the same size as a said portion of film, and
    (c) means for positioning said filter means with a selected filter in said camera body at the back thereof between said shutter and a portion of film in position to be exposed, and adjacent said portion of film, and for independently moving filter means positioned by said positioning means with respect to said film.

15. The camera apparatus of claim 14, and means for moving said filter means comprising a pair of second reels, said filter means connected to said second reels.

16. The camera apparatus of claim 15, and means for indicating the color of the selected filter in said position.

17. The camera apparatus of claim 15, wherein said filter means moving means comprises means for moving said filter transversely of film moved by said first mentioned reels.

18. The camera apparatus of claim 15, wherein said filter means moving means comprises means for moving said filter parallel to film moved by said first mentioned reels.

19. The camera apparatus of claim 14, including means to prevent contact of said filter means and said film.

* * * * *